March 9, 1954 R. B. EGBERT 2,671,791
PROCESS FOR THE TREATMENT OF GASES CONTAINING ETHYLENE
Filed May 9, 1950
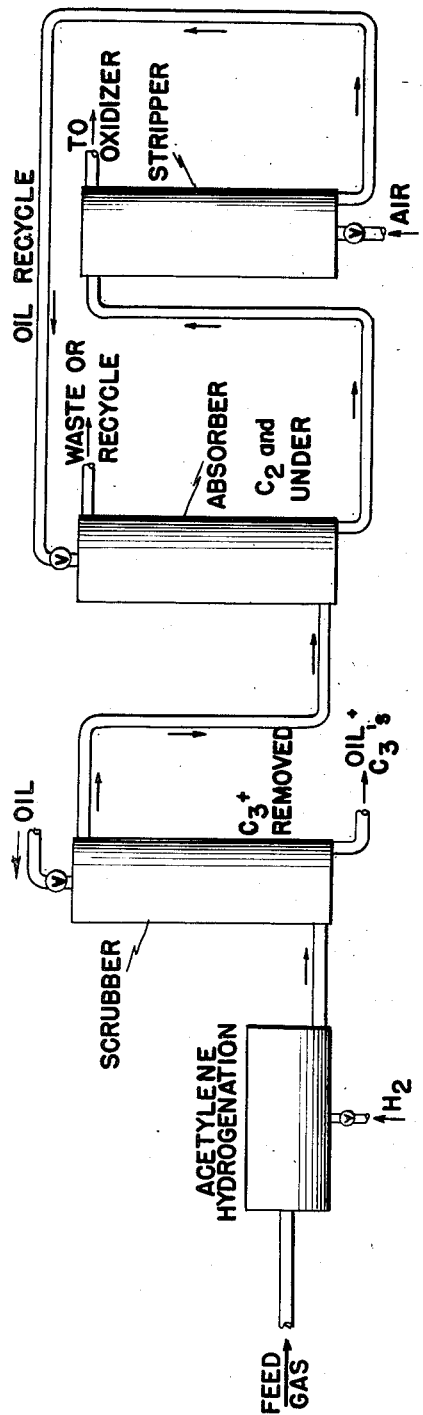
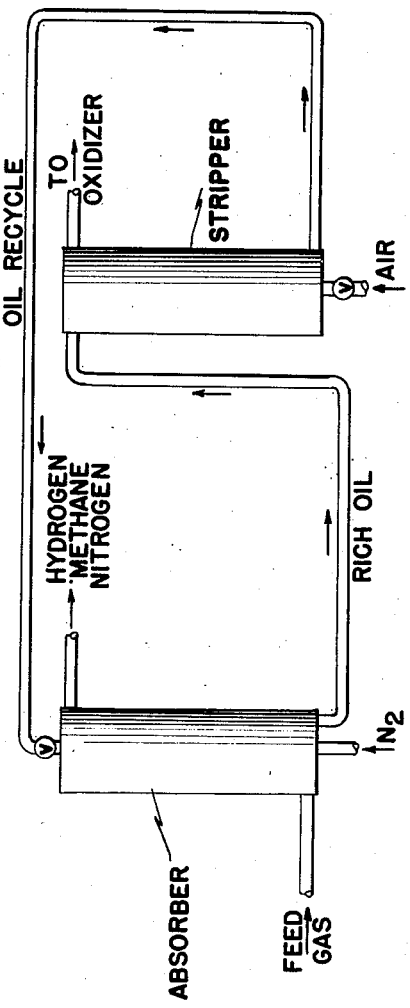
INVENTOR
Robert B. EGBERT
BY
ATTORNEYS

Patented Mar. 9, 1954

2,671,791

UNITED STATES PATENT OFFICE 2,671,791

PROCESS FOR THE TREATMENT OF GASES CONTAINING ETHYLENE

Robert B. Egbert, Roslyn Heights, N. Y., assignor to Chempatents, Inc., New York, N. Y., a corporation of Delaware Application May 9, 1950, Serial No. 160,913

12 Claims. (Cl. 260—348.5)

1

The present invention relates to the catalytic oxidation of olefins to the oxides with molecular oxygen in the presence of a surface catalyst, and has particular reference to the selective oxidation of ethylene found in minor proportions as a compound of gaseous streams formed of hydrogen and hydrocarbon other than ethylene.

In conventional processes for the oxidation of olefins, the olefin such as ethylene is first purified, requiring a supply of free energy, which is lost when the pure ethylene is diluted with air for purposes of oxidation.

In application Serial No. 159,839 filed May 3, 1950, there is disclosed a novel method for the oxidation of olefins found in dilute concentration in gaseous streams, wherein the olefin is oxidized by reaction with molecular oxygen in the presence of a silver surface catalyst at a temperature of from 240° C.–350° C. under superatmospheric pressures. The invention resides primarily in the selective oxidation of the olefins, the hydrocarbons other than olefins being subjected to conditions whereby very little, if any, oxidation occurs. A high yield of olefin oxide is obtained, with a minimum of contaminants requiring expensive purification procedures. The process therein disclosed permits the recovery of olefin oxides from readily available gaseous streams resulting for example from commercial petroleum cracking operation. The gaseous streams cleansed of olefin oxide may then be used as a fuel, or for other desired purposes, which considerably reduces the overall cost of the olefin oxide and product.

The gas stream with which the invention is advantageously employed, normally contains hydrogen and acetylene, which are recognized as being detrimental to the oxidation of olefins. In some instances, it may be desirable to effect the removal of these components from the gaseous reaction stream in order to simplify all important factors of reaction control which must be carefully exercised in olefin oxidation reactions to minimize the loss of end product as carbon dioxide and water. In application Serial No. 159,839 it is suggested that hydrogen and diolefins which may be present in the gaseous reaction mixture be removed or nullified in a preliminary operation, by selective oxidation to compounds relatively inert to the subject catalytic oxidation step. The products of the preoxidation step may be employed as inert gases for purposes of stabilizing the reaction, forming a part of the reaction stream. In the case of acetylene, it is suggested that this compound be subjected to a mild prehydrogenation, converting the acetylene to ethylene, thereby increasing the available starting material in the gaseous stream.

It is an object of the present invention to provide an improved method for the elimination of hydrogen and at least a partial separation of hydrocarbons other than olefins such as methane, from the gaseous reaction mixture, thereby stabilizing and otherwise facilitating the catalytic oxidation of the olefin content of the gaseous reaction mixture, improving the purity of the olefin oxide end product and materially reducing the cost of olefin oxide. This is accomplished without use of heat, refrigeration or other operation conditions requiring the provision of heat and refrigeration, requiring as equipment only conventional type strippers, scrubbers and absorbers with pumping facilities for the circulation of fluids. Thus, no energy is lost in the preparation of the olefin for the oxidation reaction, which from the standpoint of plant operation, effects a very real and substantial economy.

Other objects and advantages of the invention will be apparent from the following detailed description thereof taken in connection with the drawings, wherein Figures 1 and 2 are exemplary diagrams of typical systems embodying the invention.

In its broadest application, the invention embodies the treatment of gaseous reaction mixtures containing olefins, hydrogen and hydrocarbons other than olefins, to prepare the gaseous reaction mixture for use as a source of olefin for employment in a direct oxidation reaction with molecular oxygen in the presence of a catalyst. The invention is particularly useful in connection with the removal of hydrogen from the gaseous reaction mixture, and is markedly effective in the reduction of the concentration of methane which is a principal impurity in most gas streams which result from cracking of various hydrocarbon mixtures. The removal is accomplished by subjecting the gaseous reaction mixture to the action of a solvent for the olefin under conditions whereby from 80% to 90% of the hydrogen present is effectively removed. The olefin is subsequently stripped from the solvent for use in the oxidation process.

The source of olefin such as ethylene, may be any gas containing the olefins. Gas obtained from the cracking of ethane, and gases from high temperature vapor phase cracking of crude petroleum or petroleum naphtha are preferred starting materials. Other feedstocks can be used, with comparable results. In cases of gases high in ethane and propane, it is desirable to crack the gases at 1500–1800° F. before use of the gases as starting materials, thereby raising the ethylene content as high as possible.

The solvent employed comprises any solvent capable of solvent action in connection with ethylene, such as organic solvents, preferably hydrocarbon oil solvents, ranging from benzene to lubricating oils. It is preferred that the solvent be characterized by low volatility and high fluidity at normal temperature and pressures, and with these factors in mind, it has been found that kerosene is advantageously employed as the solvent. Other solvents such as higher alcohols, ketones, esters, cellosolves, water and the like are also useful.

Treatment of the ethylene-containing starter gas is carried on isothermally and essentially at room temperature, i. e., 5°–40° C. It is preferred to introduce the feed gas containing ethylene to the process at a pressure such that the partial pressure of the ethylene is slightly greater than the ethylene partial pressure of the cleansed air-ethylene gas discharged from the stripping tower in order that no heat be required by the process. As the ethylene oxidation process requires air at pressures of 150 to 200 pounds per square inch, it is convenient and desirable that the operation stripping hydrogen from the gas be conducted at pressures of this magnitude.

In carrying out the stripping operation, the ethylene containing gas is passed countercurrent to a stream of absorber hydrocarbon such as kerosene oil, in a tower packed or filled with bubble cap trays. Large amounts of solvent must be supplied, but this raises no problem as no heating process is involved, and the solvent is merely recycled between the absorber and stripper. The ratio of solvent oil to gas is adjusted to absorb 80 to 99% of the ethylene in the gaseous stream. All of the heavier components will be absorbed. A very small portion of the hydrogen present in the gaseous stream is absorbed. In the case of methane, from 10% to 50% is absorbed.

When it is desired to effect complete removal of residual hydrogen plus further removal of methane from the solvent, which may be desirable in some instances, the rich solvent may be treated with a stream of inert gas such as nitrogen, which normally is readily available to the pretreatment process from the vent gases of the ethylene oxidation process. The volume of stripper gas normally needed approximates 10% of the volume of the main gas stream. The hydrogen and methane stripping may be carried simultaneously with the solvent extraction step, in a manner to be described.

The ethylene enriched solvent is then passed countercurrent to a stream of air at the same temperature as the absorption step, which strips out the ethylene component forming the proper air-ethylene gaseous reaction mixture for the oxidation reaction to follow. The lean solvent is returned to the absorber in a recycle sequence, hence, complete stripping of ethylene from the solvent is not essential. Between 7.0 and 12.0 volumes of air per volume of ethylene are required by the oxidation process.

Since the oxidation process is ordinarily carried out at a pressure of 150 to 200 pounds per square inch gauge, it is preferred that the stripper be operated at this pressure. With an air-ethylene ratio between 7 and 12 to 1, the partial pressure of ethylene in the gases from the stripper will range from about 14 to 31 pounds per square inch.

The pressure of the starter or feed gas is adjusted at the outset to yield the proper ethylene partial pressure which must be higher than the partial pressure of ethylene in the gas from the stripper. Assuming, for example, that the feed gas contains a 30% concentration of ethylene, the total pressure on the feed gas should be from 100 to 200 pounds gauge. This will give a partial pressure of ethylene in the feed gases of 30 to 60 pounds, which is sufficiently higher than the partial pressure of ethylene in the gases from the stripper to permit the use of absorbers and strippers of an economical size.

In some cases, it may be desirable to subject the feed gas to a depropanizing operation prior to the absorption step to remove propane and propylene. This is conventionally accomplished at pressures of from 200 to 500 pounds per square inch, in which case the depropanized feed gas will be at the correct pressure for the process of the invention.

In order that the invention may be better understood, the following examples of specific application of the invention are set forth, it being understood that the examples are not to be construed as limiting the invention.

*Example A.—Ethane cracking*

An ethane cracking furnace is operated to give the highest possible single pass conversion to ethylene or ethylene and acetylene. The product gas is cooled, cleansed of tars, and desulphurized. The gas may then be processed to eliminate the acetylene component either by extractive distillation or by hydrogenation, the latter being preferred due to the increase in ethylene attained.

The $C_3+$ constituent may then be removed by scrubbing with kerosene in a preliminary step. This is not essential as the $C_3+$ components may be left in the feed gas as a diluent being lost to atmosphere at the end of the oxidation cycle. However, the $C_3+$ constituents have value as fuel factors and as raw materials in other chemical processes. For instance, they may even be returned to the cracking furnace to augment the yield of ethylene, and their separate recovery may be economically worth while.

The $C_2$ components and lighter pass from the scrubber to the absorption tower as shown in Figure 1, and the gases are subjected to an absorption step, with a hydrocarbon solvent such as kerosene oil.

The cracked ethane gas starting material may have a typical composition percentage by volume as follows:

| | Per cent |
|---|---|
| Hydrogen | 43.0 |
| Methane | 7.0 |
| Acetylene | 2.2 |
| Ethylene | 37.0 |
| Ethane | 8.4 |
| $C_3+$ | 2.4 |
| | 100.0 |

After hydrogenation, the cracked gas may have a composition as follows:

| | Per cent |
|---|---|
| Hydrogen | 40.2 |
| Methane | 7.3 |
| Acetylene | 0.05 |
| Ethylene | 40.0 |
| Ethane | 10.0 |
| $C_3+$ | 2.5 |
| | 100.0 |

This gas is then passed to the absorption tower with the flow of gas moving countercurrent to the flow of oil. For every 100 mols of feed gas, 550 mols of solvent are required, under conditions of temperature 40° C. and pressure 200 pounds per square inch gauge.

The enriched solvent leaving the absorber is pumped to the stripper, where it flows countercurrent to a stream of air. For every 550 mols of solvent, approximately 330 mols of air preferably are used.

The composition of the gas leaving the absorber to waste or recycle to the feed gas, as desired, is approximately:

|  | Per cent |
|---|---|
| Hydrogen | 84.4 |
| Methane | 10.0 |
| Ethylene | 4.5 |
| Ethane | 1.1 |
|  | 100.0 |

The feed gas leaving the stripper will be as follows:

|  | On Total Stream | Hydrocarbon fraction only |
|---|---|---|
|  | Percent | Percent |
| Hydrogen | 0.46 | 3.3 |
| Methane | 0.75 | 5.3 |
| Ethane | 2.47 | 17.6 |
| Ethylene | 9.75 | 69.2 |
| $C_3+$ | 0.65 | 4.6 |
| Oxygen | 18.1 |  |
| Nitrogen | 67.82 |  |
|  | 100.00 | 100.0 |

If a depropanizing step is included in the process before absorption, the $C_3+$ portion of the above analysis may be appreciably smaller.

If desired, the ethane fraction can be removed from the feed gas, the ethane being recycled to the cracking operation to increase the concentration of ethylene.

Example B.—Hydrogen elimination

As shown in Figure 2, the hydrogen content of the feed gas can be eliminated completely by feeding a stream of nitrogen to the base of the absorber, the feed gas entering the absorber at one side. Solvent is passed countercurrent to the flow of gas. About 10 mols of nitrogen may be used for every 100 mols of feed gas. The solvent oil ratio would be increased from 540 to 595 mols per 100 mols of feed gas.

The gas leaving the absorption tower would be composed as follows:

|  | Per cent |
|---|---|
| Nitrogen | 17.2 |
| Hydrogen | 69.4 |
| Methane | 9.14 |
| Ethane | 0.86 |
| Ethylene | 3.4 |
|  | 100.0 |

The enriched oil passing through the scrubber yields a gas having the following composition:

|  | On Total Stream | Hydrocarbon fraction only |
|---|---|---|
|  | Percent | Percent |
| Hydrogen | 0.01 | 0.1 |
| Methane | 0.50 | 3.8 |
| Ethane | 2.49 | 18.3 |
| Ethylene | 9.94 | 73.0 |
| $C_3+$ | 0.65 | 4.8 |
| Oxygen | 18.1 |  |
| Nitrogen | 68.31 |  |
|  | 100.00 | 100.0 |

It will be observed that by means of the relatively simple operation described above, a marked and valuable enrichment of the ethylene content of the feed gas passing to the oxidation system is accomplished, at nominal cost, there being no heat exchange equipment involved or fuel consumption.

Example C.—Petroleum cracking gas

An East Texas crude was cracked at 1535° F. and the product contained 20% plus ethylene by weight and 40% plus $C_2$'s and lighter by weight. This product was passed through an absorber (Figure 1 separating the $C_3$'s and heavier from the $C_2$'s and lighter. The $C_2$ fraction was then desulphurized and hydrogenated to convert acetylene to ethylene. The resulting gas product had the following approximate composition:

|  | Mol Per cent |
|---|---|
| Hydrogen | 16.1 |
| Methane | 40.7 |
| Ethane | 6.6 |
| Ethylene | 36.6 |
|  | 100.0 |

The feed gas thus cleansed is scrubbed at 40° C. and 200 pounds pressure, with 640 mols of absorber oil per 100 mols of feed gas. Ten mols of stripping nitrogen were fed to the bottom of the absorber.

The partially stripped solvent, now free of hydrogen, was scrubbed with 330 mols of air at 40° C. and 200 lbs. pressure, and the composition of the feed gas was about as follows:

|  | On the Total Basis | On Hydrocarbon Fraction |
|---|---|---|
| Hydrogen | 0.01 | 0.1 |
| Methane | 3.02 | 21.6 |
| Ethane | 1.66 | 11.9 |
| Ethylene | 9.29 | 66.4 |
| Oxygen | 18.1 |  |
| Nitrogen | 67.92 |  |
|  | 100.00 | 100.0 |

Upon mixing the cleansed gases obtained in Examples B and C with recycle gas from the ethylene oxide process, each gas had the following composition:

|  | Case B | Case C |
|---|---|---|
| Hydrogen | 0.01 | 0.01 |
| Methane | 0.53 | 3.2 |
| Ethane | 2.63 | 1.75 |
| Ethylene | 4.50 | 4.5 |
| Oxygen | 6.00 | 6.0 |
| Carbon Dioxide | 7.5 | 7.5 |
| Nitrogen | 78.83 | 77.04 |
|  | 100.00 | 100.00 |

One of the main advantages of the invention resides in the fact that any solvent characterized by fluidity and low volatility under the conditions of the process can be used with advantage. Thus, while hydrocarbon solvents are preferred such as kerosene, because of their cost, other solvents such as water are operable in connection with the process of the invention. However, if water itself is used, an excessive amount of water must be circulated through the system, and the hydrogen-ethylene separation is not as sharply marked.

Since the rich air stream passing to the oxidation process is in an explosure range, it has been found that certain precautions are advisable to avoid fires and explosions. In accordance with the invention, it has been found that the addition of small amounts of water to the solvent, in cases where the preferred hydrocarbon solvent is employed, increases the conductivity of the solvent stream, decreasing the possibility of building up an electrostatic charge on the solvent which can cause the rich air stream to catch fire.

Further precautions in connection with the apparatus employed are advisable. The stripper tower should be packed, and constructed in proportions of wall thickness capable of withstanding and minimizing the effects of a mild explosion. It may be advisable further to dilute the enriched gas passing from the stripper tower to the oxide conversion process by the introduction of recycle gas from the oxide process at the top of the stripper tower, the recycle gas containing large amounts of inert gases. Once the rich air is mixed with recycle gas, the resulting gas is no longer in an explosive range.

While the invention has been described with reference to specific embodiments, it is to be limited only as defined in the appended claims.

I claim:

1. A method for the treatment of feed gases containing ethylene, hydrogen and hydrocarbons other than ethylene to obtain a gaseous reaction mixture consisting primarily of ethylene plus oxygen in concentrations suitable for the direct oxidation of olefins to olefin oxides, and inert gases, comprising passing the gaseous stream through a solvent to absorb the ethylene content of the gaseous stream, simultaneously subjecting the ethylene enriched solvent to the stripping action of an inert gas to remove residual quantities of hydrogen and hydrocarbons other than ethylene which may be absorbed by the solvent, and then passing a gas containing oxygen and inert gases through the enriched solvent to strip the ethylene content therefrom forming a gaseous reaction mixture consisting primarily of ethylene, oxygen and inert gas having a concentration of ethylene ranging from 4½ to 13%.

2. A method for the treatment of feed gases containing ethylene, hydrogen and hydrocarbons other than ethylene to obtain directly a gaseous reaction mixture consisting primarily of ethylene as the hydrocarbon plus oxygen in concentrations suitable for the direct oxidation to ethylene oxide, comprising passing the gaseous stream countercurrent to a liquid solvent to absorb the ethylene content, simultaneously passing a stream of nitrogen countercurrent to the solvent to strip hydrogen and low boiling point hydrocarbons other than ethylene from the solvent, exhausting the nitrogen, hydrogen and low boiling point hydrocarbons other than ethylene from the system, passing the ethylene enriched solvent countercurrent to a stream of air in the proportions of 7.0–12.0 volumes of air to one volume of ethylene to form an ethylene-air mixture containing from 7 to 13% ethylene, withdrawing the ethylene air mixture from the system, and recycling the solvent to the initial ethylene absorption step.

3. In the process of claim 2, the solvent being a hydrocarbon.

4. In the process of claim 2, the solvent being kerosene.

5. In the process of claim 2, the nitrogen being present in the proportion of approximately ten mols of nitrogen to every 100 mols of gaseous stream.

6. A process for the preparation of a feed gas for the oxidation of ethylene at elevated temperatures and pressures from gaseous streams containing ethylene, hydrogen and hyrocarbons other than ethylene comprising selectively absorbing ethylene from the gaseous stream with a solvent at substantially atmospheric temperatures, and passing a stream of air in the ratio of about 7 to 12 mols of air to one mol of ethylene countercurrent to the enriched solvent to strip ethylene therefrom to form ethylene-oxygen reaction mixture containing about 7 to 13% ethylene, and the pressure of the gaseous stream being such that the partial pressure of the ethylene therein exceeds the partial pressure of the ethylene in the enriched gas from the stripping operation.

7. A process for the manufacture of ethylene oxide from a feed gas containing ethylene, hydrogen and hydrocarbons other than ethylene comprising passing the feed gas in contact with a solvent to absorb ethylene therefrom and form a rich solvent, stripping the ethylene from the rich solvent by passing air for the oxidation therethrough forming an ethylene-air mixture containing approximately 7 to 13% ethylene, passing the resultant mixture of ethylene and air in contact with a silver catalyst at temperatures ranging from 240° to 350° C. for the direct oxidation of the ethylene to ethylene oxide, separating ethylene oxide from the reaction products to leave a recycle gas, mixing the recycle gas with the ethylene air mixture for passing in contact with the catalyst, and bleeding a portion of the recycle gas to purge inerts from the system.

8. A method for the treatment of feed gases containing ethylene, hydrogen and hydrocarbons other than ethylene to obtain directly a gaseous reaction mixture consisting primarily of ethylene as a hydrocarbon plus oxygen in concentrations suitable for the direct oxidation of ethylene to ethylene oxide, comprising passing the gaseous stream countercurrent to a liquid solvent to absorb the ethylene content, simultaneously passing a stream of an inert gas countercurrent to the solvent to strip hydrogen and low boiling point hydrocarbons other than ethylene from the solvent, exhausting the nitrogen, hydrogen and low boiling point hydrocarbons other than ethylene from the system, passing the ethylene enriched solvent countercurrent to a stream of oxygen and inert gases in proportions to form a reaction mixture containing 4½ to 13% ethylene, withdrawing the reaction mixture from the system, and recycling the solvent to the initial ethylene absorption step.

9. A process for the manufacture of ethylene from a feed gas containing ethylene, hydrogen and hydrocarbons other than ethylene comprising passing the feed gas in contact with a solvent to absorb ethylene therefrom and form a rich solvent, simultaneously passing an inert gas in contact with the solvent to strip hydrogen and low boiling point hydrocarbons other than ethylene from the solvent, stripping the ethylene from the rich solvent by passing air for the oxidation countercurrent thereto, forming an ethylene-air mixture containing approximately 7 to 13% ethylene, passing the resultant mixture of ethylene and air in contact with a silver catalyst with temperatures of 240° to 350° C. for the direct oxidation to ethylene oxide, separating ethylene oxide from the reaction products to leave recycle gas, mixing the recycled gas with the ethylene-air mixture for passing in contact with the catalyst, and bleeding a portion of the recycle gas to purge inerts from the system.

10. A process as set forth in claim 9 in which the inert gases are passed in contact to the solvent in a ratio of approximately 1 mol of inert gas to 10 mols of feed gas.

11. A process for the manufacture of ethylene from a feed gas containing ethylene, hydrogen and hydrocarbons other than ethylene, comprising passing the feed gas countercurrently in contact with a solvent to form a solvent rich in ethylene, passing the rich solvent countercurrently in contact with air for the oxidation of ethylene to form an ethylene-air mixture containing approximately 7 to 13% ethylene and leave a lean solvent, recycling the lean solvent to the absorption step, passing the resultant mixture of ethylene and air in contact with a silver catalyst at temperatures ranging from 240° to 350° C. for the direct oxidation of the ethylene to ethylene oxide, separating ethylene oxide from the reaction products to leave a recycle gas, mixing the recycle gas with the ethylene-air mixture for passing in contact with the catalyst, and bleeding a portion of the recycle gas to purge inerts from the system.

12. A process for the preparation of a feed gas for the oxidation of ethylene at elevated temperatures and pressures from gaseous streams containing ethylene, hydrogen and hydrocarbons other than ethylene comprising selectively absorbing ethylene from the gaseous stream with a solvent at substantially atmospheric temperatures, and passing a stream of air in the ratio of about 7 to 12 mols of air to one mol of ethylene counter-current to the enriched solvent to strip ethylene therefrom to form an ethylene-oxygen reaction mixture containing from 4½ to 13% of ethylene, the pressure of the gaseous stream being such that the partial pressure of the ethylene therein exceeds the partial pressure of the ethylene in the enriched gas from the stripping operation.

ROBERT B. EGBERT.

References Cited in the file of this patent

UNITED STATES PATENTS

| Number | Name | Date |
|---|---|---|
| 2,241,019 | Metzger | May 6, 1941 |
| 2,369,559 | Gilliland | Feb. 13, 1945 |
| 2,463,482 | Francis | Mar. 1, 1949 |
| 2,542,520 | Hibshman | Feb. 20, 1951 |